United States Patent Office 3,215,545
Patented Nov. 2, 1965

3,215,545
TITANIUM DIBORIDE ARTICLES AND METHOD FOR MAKING SAME
Ronald W. Reidl, Findlay, and Jurgen Hartwig, Fostoria, Ohio, assignors to Union Carbide Corporation, a corporation of New York
No Drawing. Filed Dec. 26, 1962, Ser. No. 247,381
7 Claims. (Cl. 106—55)

The present invention relates to high strength, high density titanium diboride articles.

More particularly, the present invention relates to the use of niobium diboride and tungsten boride in the manufacture of the aforesaid articles.

A continuing problem in the manufacture of titanium diboride articles by pressing and sintering is that of obtaining relatively high density concurrently with high strength.

With presently known techniques, sintering of titanium diboride provides articles af about 82–86 percent of theoretical density with good strength. Increasing the sintering temperature will improve the density to some extent, however, excessive grain growth at higher temperatures has the effect of substantially reducing the strength of the sintered articles.

It is therefore an object of the present invention to provide a sintered titanium diboride article having improved density and high strength.

It is also an object of the present invention to provide a relatively low tempertaure sintering process for producing high density titanium diboride articles having high strength.

Other objects will be apparent from the following description and claims.

A titanium diboride article, in accordance with the present invention, is a pressed and sintered mixture of titanium diboride with from about 3 to about 8 parts per hundred by weight of a material selected from the group consisting of $NbB_2$ and $W_2B_5$. The aforedescribed article of this invention is characterized by superior strength and density as compared to a titanium diboride article prepared in the same manner without the use of the selected material.

In the practice of the present invention, particles of titanium diboride and between 3 and 8 parts per hundred of particles of the selected material, e.g., niobium diboride are milled together in a ball mill to obtain a good mixture of finely divided particles. The particle sizing in the mixture is not critical, however, the smaller the particle size, the higher will be the density of the final article. An average particle size in the mixture of from about $1.5\mu$ to about $3.0\mu$ provides highly satisfactory results.

After the foregoing treatment, the mixture is pressed by conventional techniques to a suitable desired size and shape. For example, the mixture can be cold pressed at about 10 tons per square inch and subsequently sintered. Alternatievly, the mixture can be hot pressed.

In either method, the material is sintered at a temperature of from about 1800° C. to about 2150° C. A carbon tube furnace can be used in the heating step.

The resulting article has a density of about 90 percent or more of theoretical and additionally has substantially improved strength over $TiB_2$ without additive when processed in a similar manner.

An advantage of the present invention is that relatively low sintering temperatures, i.e. 1800° C. to 2150° C. can be used to provide a high density, high strength article.

This advantage is important since commercially available titanium diboride, without the addition of $NbB_2$ or $W_2B_5$, requires sintering temperatures of about 2225° C. to provide high density sintering, and at such temperatures, excessive grain growth results in poor strength in the sintered article.

The ability to use relatively low sintering temperatures is also important when using carbon furnaces since the problem of carbon dissolution in the titanium diboride is avoided at the lower sintering temperatures.

With regard to the materials used in the present invention, the titanium diboride, $NbB_2$ and $W_2B_5$ may be any commercially available products.

The mixing of the materials is preferably accomplished by blending the mixture constituents during the ball milling operation.

When using $NbB_2$ as the additive, a content of about 7.5 parts per hundred $NbB_2$ in the mixture is preferred. With $W_2B_5$ as the additive, a content of about 6 parts per hundred has been found to provide highly satisfactory results.

The following examples will further serve to illustrate the present invention.

EXAMPLE I

Separate batches of different proportions of commercially available titanium diboride and niobium diboride (98 percent Nb+B) were milled with 3/8" diameter stainless steel balls for 48 hours. The resulting particles were provided with a temporary binder by applying 3 parts per hundred epoxy resin in the form of an acetone solution. The resultant slurry was air dried to evolve acetone, thus depositing resin on the $TiB_2$ particles. Cylindrical samples 1" long x 1" in diameter were prepared from the various mixtures by cold pressing at 10 tons per in.$^2$. The samples were subsequently sintered in an argon atmosphere in a carbon tube furnace by heating the furnace at a rate of 400° C. per hour to a particular temperature between 1800° C. and 2150° C. and held at this temperature for 3 hours.

The resulting sintered articles were then subjected to various measurements. The results are shown in Table I.

*Table I*

| Mixture | Sintering Temperature, ° C. | Sintered Apparent Density | Theoretical Apparent Density | Percent of Theoretical Apparent Density |
|---|---|---|---|---|
| $TiB_2$ | 1,850 | 3.87 | 4.52 | 85.7 |
|  | 2,000 | 3.82 | 4.52 | 84.6 |
|  | 2,130 | 3.86 | 4.52 | 85.5 |
| $TiB_2$+3 pph. $NbB_2$ | 1,850 | 3.87 | 4.57 | 84.6 |
|  | 2,000 | 4.08 | 4.57 | 89.4 |
|  | 2,130 | 4.00 | 4.57 | 87.5 |
| $TiB_2$+5 pph. $NbB_2$ | 1,850 | 4.12 | 4.60 | 89.6 |
|  | 2,000 | 4.19 | 4.60 | 91.1 |
| $TiB_2$+6 pph. $NbB_2$ | 1,850 | 4.06 | 4.62 | 87.9 |
|  | 2,000 | 4.25 | 4.62 | 92.1 |
|  | 2,130 | 4.27 | 4.62 | 92.5 |
| $TiB_2$+7.5 pph. $NbB_2$ | 1,850 | 4.24 | 4.63 | 91.6 |
|  | 2,000 | 4.30 | 4.63 | 92.9 |
| $TiB_2$+10 pph. $NbB_2$ | 1,850 | 4.00 | 4.68 | 85.4 |
|  | 2,000 | 4.03 | 4.68 | 86.1 |
|  | 2,130 | 3.88 | 4.68 | 82.9 |

EXAMPLE II

Mixtures prepared as in Example I were hot pressed at 2000 p.s.i. in a 1" diameter cylindrical mold during heating in a carbon tube furnace.

To hot press the mixtures, the furnace was first heated rapidly to 1000° C. and then heated at 400° C. per hour to 1800° C. and held at this temperature for 1 hour. The hot pressed samples were then subjected to various measurements. The results are shown in Table II.

*Table II*

| Mixture | Apparent Density | Percent of Theoretical Density | Flexural Strength, p.s.i. | Elastic Modulus ×10⁶ p.s.i. |
|---|---|---|---|---|
| $TiB_2$ | 4.38 | 97 | 7,500 | 65 |
| $TiB_2$+5 pph. $NbB_2$ | 4.38 | 95 | 13,300 | 65 |
| $TiB_2$+7.5 pph. $NbB_2$ | 4.36 | 94 | 39,000 | 73 |

EXAMPLE III

Mixtures of titanium diboride and $W_2B_5$ were prepared and sintered in the same manner as Example I.

The resulting sintered articles were subjected to various measurements, and the results are shown in Table III.

*Table III*

| Mixture | Min. and Max. Percent of Theoretical Density for 5 samples |
|---|---|
| $TiB_2$+6 pph. $W_2B_5$ | 89.6–93.5 |

EXAMPLE IV

Mixtures of titanium diboride and $W_2B_5$ were prepared and hot pressed in the same manner as Example II.

The resulting articles were subjected to various measurements, and the results are shown in Table IV.

*Table IV*

| Mixture | Apparent Density | Percent of Theoretical Density | Flexural Strength, p.s.i. | Elastic Modulus ×10⁶ p.s.i. |
|---|---|---|---|---|
| $TiB_2$ | 4.38 | 97 | 7,500 | 65 |
| $TiB_2$+3 pph. $W_2B_5$ | 4.43 | 96 | 44,500 | 67 |
| $TiB_2$+6 pph. $W_2B_5$ | 4.55 | 97 | 34,600 | 69 |

It is considered that the aforedescribed invention represents a significant contribution to the art in providing a high density, high strength titanium diboride article which can be used effectively in many applications such as for example, containers for molten aluminum and cathode lead in rods in aluminum production.

What is claimed is:

1. As an article of manufacture a pressed and sintered mixture of titanium diboride and between 3 and 8 parts per hundred of a material selected from the group consisting of $NbB_2$ and $W_2B_5$, said article being characterized by high density and high strength.

2. As an article of manufacture a pressed and sintered mixture of titanium diboride and about 7.5 parts per hundred $NbB_2$, said article being characterized by high density and high strength.

3. As an article of manufacture a pressed and sintered mixture of titanium diboride and about 6 parts per hundred $W_2B_5$, said article being characterized by high density and high strength.

4. As an article of manufacture a pressed and sintered mixture of titanium diboride and about 3 parts per hundred $W_2B_5$, said article being characterized by high density and high strength.

5. A process for producing high density, high strength titanium diboride articles which comprises pressing and sintering a mixture consisting essentially of titanium diboride and between 3 and 8 parts per hundred of a material selected from the group consisting of $NbB_2$ and $W_2B_5$, the maximum sintering temperature being in the range of 1800° to 2150° C.

6. A process for producing high density, high strength titanium diboride articles which comprises cold pressing and subsequently sintering a mixture consisting essentially of titanium diboride and between 3 and 8 parts per hundred of a material selected from the group consisting of $NbB_2$ and $W_2B_5$, the maximum sintering temperature being in the range of 1800° to 2150° C.

7. A process for producing high density, high strength titanium diboride articles which comprises hot pressing a mixture consisting essentially of titanium diboride and between 3 and 8 parts per hundred of a material selected from the group consisting of $NbB_2$ and $W_2B_5$, the maximum sintering temperature being in the range of 1800° to 2150° C.

References Cited by the Examiner

UNITED STATES PATENTS 2,802,748   8/57   Glaser _____ 106—55

TOBIAS E. LEVOW, *Primary Examiner.*